(12) United States Patent
Thimbleby

(10) Patent No.: US 8,593,488 B1
(45) Date of Patent: Nov. 26, 2013

(54) SHAPE DISTORTION

(75) Inventor: William John Thimbleby, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 546 days.

(21) Appl. No.: 12/854,876

(22) Filed: Aug. 11, 2010

(51) Int. Cl.
*G09G 5/00* (2006.01)
*G06F 3/00* (2006.01)
*G06F 3/048* (2013.01)

(52) U.S. Cl.
USPC ............ 345/647; 345/619; 715/762; 715/763

(58) Field of Classification Search
USPC .......... 345/441–442, 619, 647; 715/700, 762, 715/763
See application file for complete search history.

(56) References Cited

U.S. PATENT DOCUMENTS

| | | | | |
|---|---|---|---|---|
| 6,219,032 | B1 * | 4/2001 | Rosenberg et al. | 345/157 |
| 6,963,350 | B1 * | 11/2005 | Perani et al. | 345/676 |
| 7,557,794 | B2 * | 7/2009 | Rosenberg et al. | 345/156 |
| 7,583,276 | B1 * | 9/2009 | Worthington | 345/647 |
| 2007/0199108 | A1 * | 8/2007 | Angle et al. | 901/17 |
| 2009/0259539 | A1 * | 10/2009 | Dawson et al. | 705/14 |
| 2011/0001438 | A1 * | 1/2011 | Chemel et al. | 315/297 |
| 2011/0199302 | A1 * | 8/2011 | Tossell et al. | 345/158 |

OTHER PUBLICATIONS

Dmitry Kirsanov, The Book of Inkscape: The Definitive Guide to the Free Graphics Editor, 2009, No Starch Press, Inc, San Francisco, Chapters 2, 4-14, ISBN: 978-1-59327-181-7.*
Steve Johnson, Adobe Photoshop CS4 on Demand, 2009, Que Publishing, pp. 324-327, ISBN: 978-0-7897-3835-6.*
Maureen Miller, CorelDraw Graphics Suite X6 Reviewers Guide 2012, Corel Corporation, http://www.corel.com/static/product_content/cdgs/x6/CDGSX6_ReviewersGuide.pdf (Accessed Dec. 7, 2012).*
Alvaro Guzman, A Comprehensive Guide to Photoshop's Liquify Tool, 2010, Psdtut+, http://psd.tutsplus.com/tutorials/tools-tips/a-comprehensive-guide-to-photoshops-liquify-tool/ (accessed Dec. 11, 2012).*
Tavmjong Bah, Inkscape: Guide to a Vector Drawing, 2009, SourceForge Community Press (html version), http://tavmjong.free.fr/INKSCAPE/MANUAL_v14/html/ (accessed Dec. 11, 2012).*

* cited by examiner

*Primary Examiner* — Aaron M Richer
*Assistant Examiner* — Michael J Cobb
(74) *Attorney, Agent, or Firm* — Fletcher Yoder PC

(57) ABSTRACT

A method for distorting drawing objects using a graphics editing application is provided. The method includes receiving a vector drawing object on a drawing area of the graphics editing application. The method also includes selecting a distortion feature of the graphics editing application. Furthermore, the method includes applying the distortion feature to the vector drawing object on the drawing area of the graphics editing application.

20 Claims, 12 Drawing Sheets

SHAPE DISTORTION

CROSS-REFERENCE TO RELATED APPLICATION

This application is related to U.S. patent application Ser. No. 12/854,884, filed on Sep. 30, 2009, entitled "Shape Distortion," which is hereby incorporated herein by reference.

FIELD OF INVENTION

The present invention relates generally to the field of graphics editing and, in particular, to the field of distorting drawing objects in a graphics editing application.

BACKGROUND OF INVENTION

Current graphics editing applications may include features and tools for drawing 2D and 3D letters, lines, circles, squares, rectangles, triangles, and other shape-types. In addition, current graphics editing applications may also include features for sending shapes behind other shapes, bringing shapes forward from behind other shapes, filling shapes with colors/styles, inserting text/pictures, drawing with a pencil/paintbrush-type tool, rotating/flipping shapes, aligning text or shapes to the left/center/right, and for manually moving shapes around a drawing area.

However, current graphics editing applications do not provide a system or method for distorting drawing objects in a graphics editing application by automatically, according to data/parameters, pushing, roughing, smoothing, growing, shrinking, attracting, repelling, or twisting the drawing objects based on interactions with an icon (e.g., brush, cursor, pointer) on a on a drawing area. Current graphics editing applications do not provide for receiving a drawing object on a drawing area of the graphics editing application, selecting a distortion feature of the graphics editing application, and applying the distortion feature to the drawing object on the drawing area of the graphics editing application.

SUMMARY OF THE INVENTION

Accordingly, the present invention is directed to a system and method for distorting drawing objects in a graphics editing application that substantially obviates one or more problems due to limitations and disadvantages of the related art.

In an embodiment, the present invention provides a computer-implemented method for distorting drawing objects in a graphics editing application, the method including the steps of receiving a drawing object on a drawing area of the graphics editing application, selecting a distortion feature of the graphics editing application, and applying the distortion feature to the drawing object on the drawing area of the graphics editing application.

In another embodiment, a system comprises one or more processors, memory, a display device, and one or more programs stored in memory, where the one or more programs have instructions to receive a drawing object on a drawing area of the graphics editing application, select a distortion feature of the graphics editing application, and apply the distortion feature to a drawing object on the drawing area of the graphics editing application.

In yet another embodiment, a computer-readable storage medium stores one or more programs configured for execution by a computer, the one or more programs having instructions to receive a drawing object on a drawing area of the graphics editing application, select a distortion feature of the graphics editing application, and apply the distortion feature to a drawing object on the drawing area of the graphics editing application.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of standalone system or client-server compatible system containing any type of client, network, server, and database elements.

Figure 1:
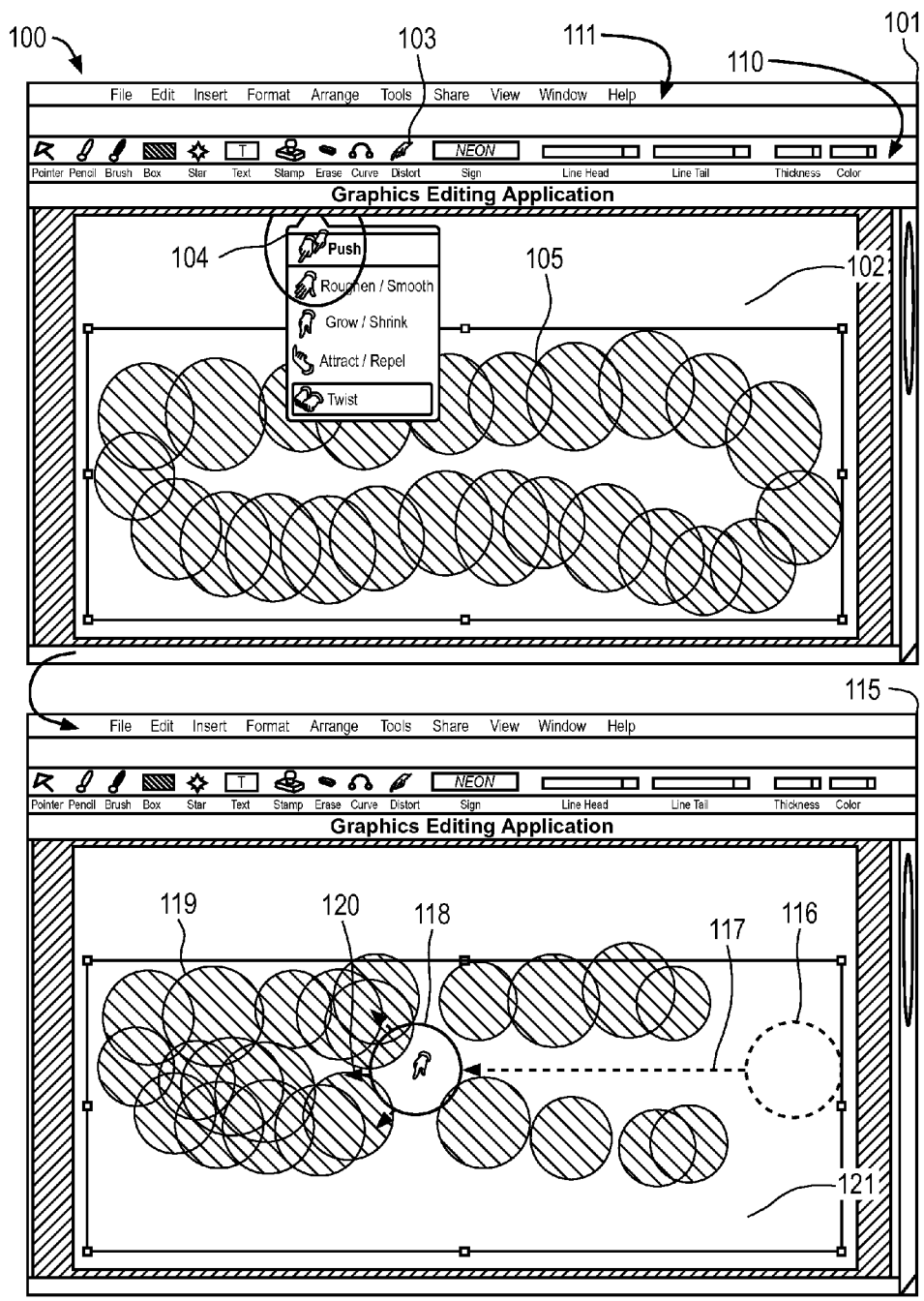
FIG. 1 illustrates an exemplary embodiment of a graphics editing application illustrating a push shape feature in accordance with the present invention.

FIG. 1 illustrates an exemplary embodiment 100 of a graphics editing application 101 illustrating a push shape feature 104 in accordance with the present invention. In the exemplary embodiment 100, a user may activate the graphics editing application 101 to draw, edit, manipulate, and view various graphics, including shapes, such as lines, squares, circles, rectangles, triangles, other shape-types, and text/pictures, each separately or in combinations. In exemplary embodiment 100, a user may activate the graphics editing application 101 to draw, manipulate, edit, and view various graphics in a drawing area 102 (i.e., a drawing canvas). The graphics editing application 101 may include several menu features 111 such as, for example, file, edit, insert, format, arrange, tools, share, view, window, and help. Each of these menu features 111 may further include additional features or options for creating, editing, and/or manipulating a graphics presentation through the graphics editing application 101. Each of the menu features 111, as well as any additional features or options, may have one or more corresponding modules/engines for implementing the execution of the invoked menu feature or option by sending instructions to one or more computer processors for execution.

In exemplary embodiment 100, the graphics editing application 101 may also include several icon shortcuts 110 to menu features or options. The icon shortcuts 110 may have one or more corresponding modules/engines for implementing the execution of the invoked menu feature or option by sending instructions to one or more computer processors for execution. Icon shortcuts 110 may be selected by a user to, for example, distort 103 shapes/drawing objects 105 on the drawing area 102. The distort 103 feature may be used to push 104, roughen/smooth (not shown), repel 204 (shown in FIG. 2), attract 304 (shown in FIG. 3), grow 404 (shown in FIG. 4), shrink 504 (shown in FIG. 5), and/or twist (not shown) shapes/drawing objects on the drawing area 102.

Figure 8:
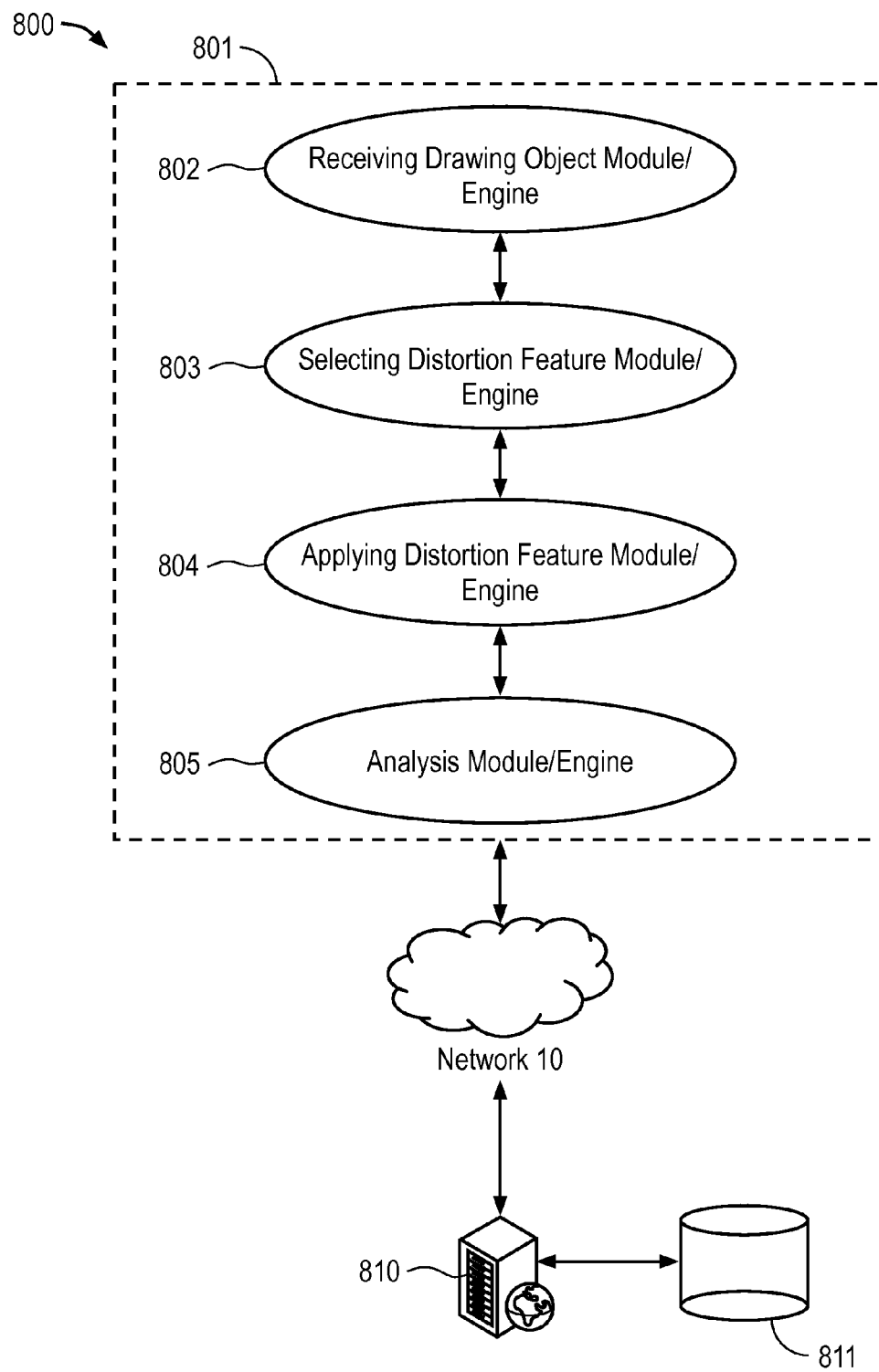
FIG. 8 illustrates exemplary modules of a graphics editing application in accordance with the present invention.
Figure 10:
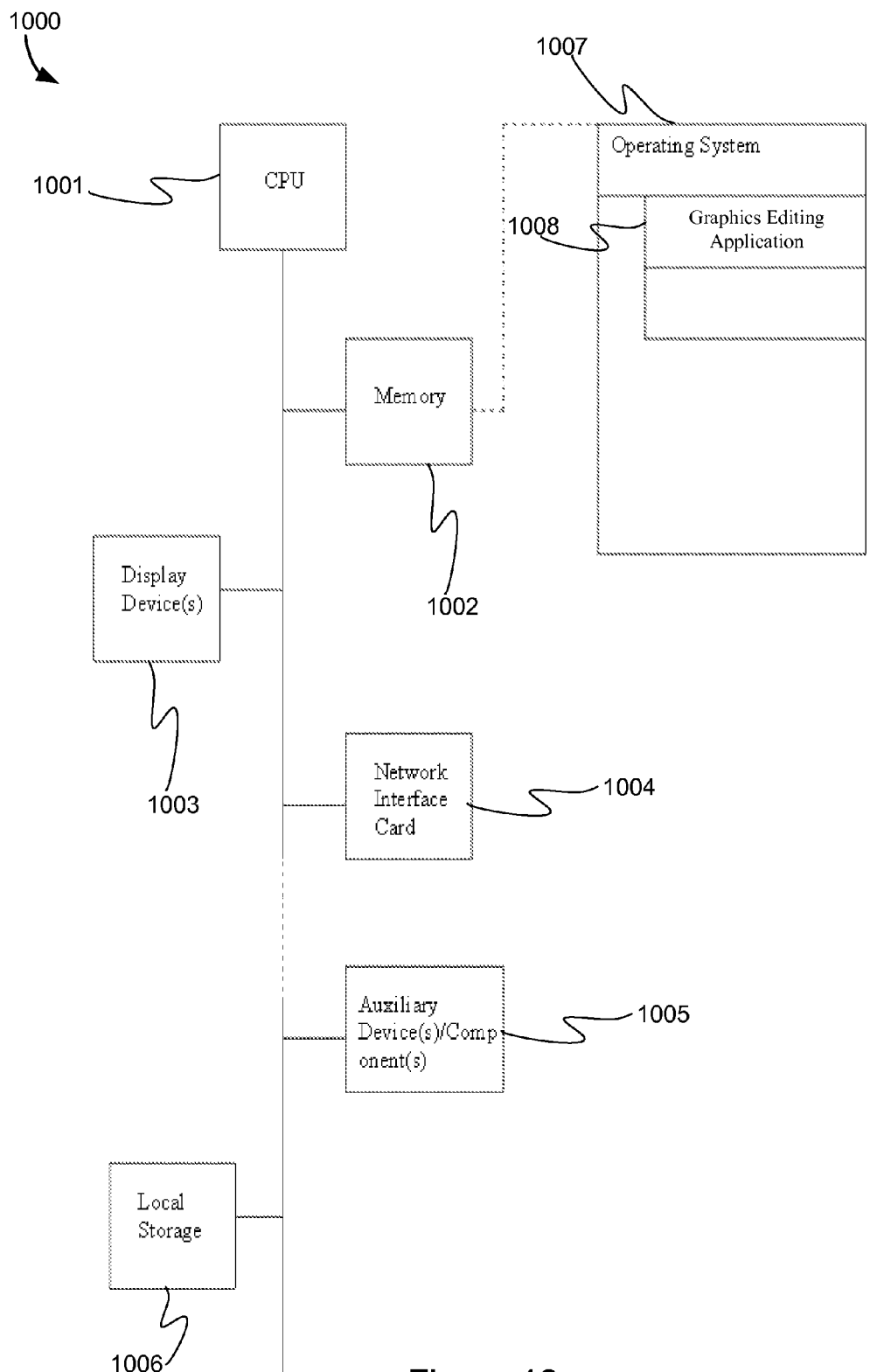
FIG. 10 illustrates an exemplary system block diagram of a system executing a graphics editing application in accordance with the present invention.

The graphics editing application 101 may interact and communicate with a graphics editing application module 801 (shown in FIG. 8; also shown in FIG. 10 as graphics editing application module 1008). Graphics editing application module 801 may be implemented in an object-oriented programming language, such as Objective-C, C, C++, and/or Java. Graphics editing application module 801 may be a class library storing classes and/or modules/engines for carrying out one or more features of the graphics editing application module 801. For example, the modules/engines may include a receiving drawing object module/engine 802, a selecting distortion feature module/engine 803, an applying distortion feature module/engine 804, and an analysis module/engine 805 (all shown in FIG. 8). Each of modules 802-805 may implement one or more features or tools of the graphics editing application module 801 by sending instructions to the computer processing unit 1001 (shown in FIG. 10).

In graphics editing application 101, each shape drawn in the drawing area 102 may be considered a drawing object. Data/parameters associated with the shapes/drawing objects 105 may be stored in a file, such as an XML/HTML file or other markup/scripting language file type. Each shape/drawing object may have a geometry and a path. The geometry and path for each drawing object may be stored in the XML/HTML file or other file in memory 1002 and/or local storage 1006 (shown in FIG. 10). For example, each of the shapes/drawing objects (e.g., circles) may have an x-coordinate, a y-coordinate, a z-coordinate, a radius, a diameter, a length, a width, a height, a color, and/or other characteristics.

In some embodiments, shapes/drawing objects may be rendered graphically on the drawing area using an OpenGL API. Shape/drawing object models may be constructed using the basic objects of OpenGL such as, for example, points, lines, and polygons. Other features of the OpenGL API may also be invoked such as, for example, geometric primitives for describing objects mathematically, coding the color of shapes/drawing objects, arranging and modeling objects, shading a shape/drawing object smoothly, tracking the z-coordinates of shapes/drawing objects, operating on pixels, transforming shapes/drawing objects (e.g., rotating the shapes/drawing objects), and selecting a shape/drawing object and/or a specific portion of the drawing area.

In some embodiments, a push shape feature 104 may be implemented by one or more modules 802-805 of the graphics editing application 101. The push shape feature 104 may become visible when the user of the graphics editing application 101 invokes a distort 103 icon on the user interface. Invoking the distort 103 icon on the user interface may call the selecting distortion feature module/engine 803 (shown in FIG. 8) with a passed value to indicate the push shape feature 104. The selecting distortion feature module/engine 803 may receive data from the receiving drawing object module/engine 802 (shown in FIG. 8) indicating the location (e.g., x-coordinate, y-coordinate, z-coordinate, and/or other data) of the drawing objects 105 on the drawing area 102. The push shape feature 104 may operate on all or some of the shapes/drawing objects 105 (e.g., circles) of the drawing area 102. The application of the push shape feature 104 to the shapes/drawing objects 105 may include using a cursor, pointer, brush, or other icon 116 to apply a pushing force that may be calculated by the apply distortion feature module/engine 804 and/or the analysis module/engine 805 (shown in FIG. 8). The applied force 120 on one or more shapes/drawing objects 119 may be calculated based on a distance 117 traveled by the icon 116 from an initial position of the icon 116 to an end position of the icon 118, and may also be calculated based on the speed at which the icon 116 travels the distance 117. Inherently, the calculation of the force 120 may include the proximity of the icon 116 to the drawing objects because the closer the icon 116 is to the drawing objects in its initial state, the less distance and lower speed it may travel prior to making contact with the drawing objects and causing the force 120 to be applied at the end position of the icon 118. An exemplary embodiment of the push shape feature 104 is illustrated in the graphics editing application 115. The graphics editing application 115 illustrates the effect of applying the push shape feature 104 in accordance with a force 120 that is applied to cause the drawing objects 119 to be pushed on the drawing area; as illustrated in the graphics application 115, the drawing objects 119 may rest in a position where each drawing object may overlap another drawing object. The application of the force may be performed by the applying distortion feature module/engine 804 (shown in FIG. 8). The z-coordinate of each drawing object may determine which drawing object lies on the top of each other overlapping drawing object. In another embodiment, the drawing objects 119 may not be permitted to overlap and may push each other on the drawing area 121. In such an embodiment, the force applied by the icon 118 may be transferred in full or in part to each drawing object with which a pushed drawing object may come into contact with on the drawing area 121.

In some embodiments, the push shape feature 104 may first call the receiving drawing object module/engine 802 (shown in FIG. 8) to determine the location of drawing objects 105, if any, on the drawing area 102.

Figure 2:
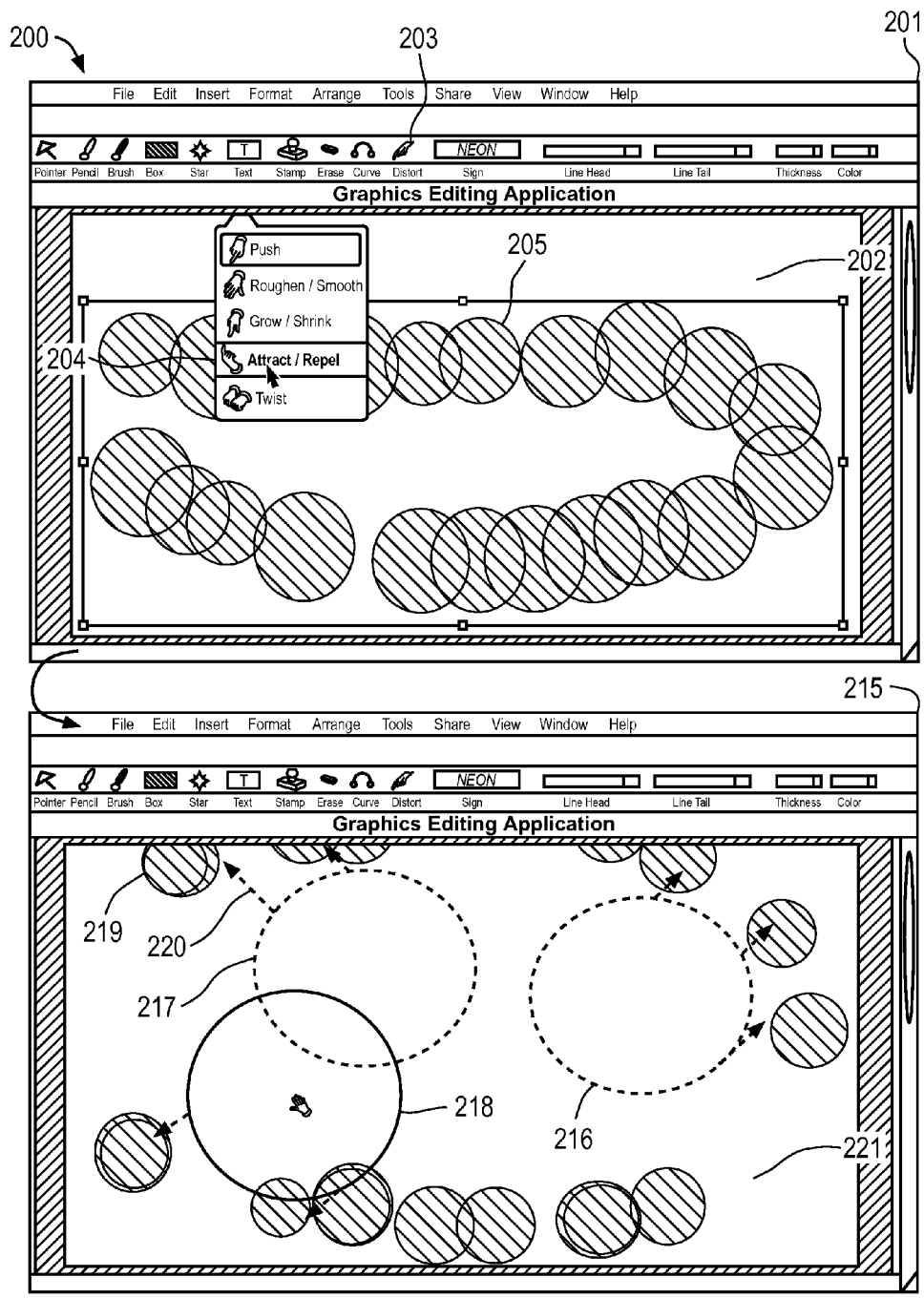
FIG. 2 illustrates an exemplary embodiment of a graphics editing application illustrating a repel shape feature in accordance with the present invention.

FIG. 2 illustrates an exemplary embodiment 200 of a graphics editing application 201 illustrating a repel shape feature 204 in accordance with the present invention. The repel shape feature 204 may be implemented by one or more modules 802-805 of the graphics editing application 201. The repel shape feature 204 may become visible when the user of the graphics editing application 201 invokes a distort 203 icon on the user interface. Invoking the distort 203 icon on the user interface may call the selecting distortion feature module/engine 803 (shown in FIG. 8) with a passed value to indicate the repel shape feature 204. The selecting distortion feature module/engine 803 may receive data from the receiving drawing object module/engine 802 (shown in FIG. 8) indicating the location (e.g., x-coordinate, y-coordinate, z-coordinate, and/or other data) of the drawing objects 205 on the drawing area 202. The repel shape feature 204 may operate on all or some of the shapes/drawing objects 205 (e.g., circles) of the drawing area 202. The application of the repel shape feature 204 to the shapes/drawing objects 205 may include using a cursor, pointer, brush, or other icons 216, 217, 218 to apply a repelling force that may be calculated by the apply distortion feature module/engine 804 and/or the analysis module/engine 805 (shown in FIG. 8). The applied force 220 on one or more shapes/drawing objects 219 may be calculated based on the proximity of the icons 216, 217, 218 to the drawing objects 219. For example, the closer the icons 216, 217, 218 are to the drawing objects 219, the greater the force 220 that may be applied to the drawing objects 219. Similarly, the farther the icons 216, 217, 218 are from the drawing objects 219, the less the force 220 that may be applied to the drawing objects 219. In some embodiments, the size of the icons 216, 217, 218 may be changed such that the icons 216, 217, 218 are made smaller or larger in size (e.g., diameter); when made larger, more of the drawing objects 219 may be affected by less significant movements of the icons 216, 217, 218 on the drawing area 221, but when made smaller, less of the drawing objects 219 may be affected by more significant movements of the icons 216, 217, 218. An exemplary embodiment of the repel shape feature 204 is illustrated in the graphics editing application 215. The graphics editing application 215 illustrates the effect of applying the repel shape feature 204 in accordance with a force 220 that is applied to cause the drawing objects 219 to be repelled on the drawing area; as illustrated in the graphics application 215, the drawing objects 219 may rest in a position where each drawing object may overlap another drawing object. The application of the force may be performed by the applying distortion feature module/engine 804 (shown in FIG. 8). The z-coordinate of each drawing object may determine which drawing object lies on the top of each other overlapping drawing object. In another embodiment, the drawing objects 219 may not be permitted to overlap and may repel each other on the drawing area 221. In such an embodiment, the force applied by the icons 216, 217, 218 may be transferred in full or in part to each drawing object with which a repelled drawing object may come into contact with on the drawing area 221.

Figure 3:
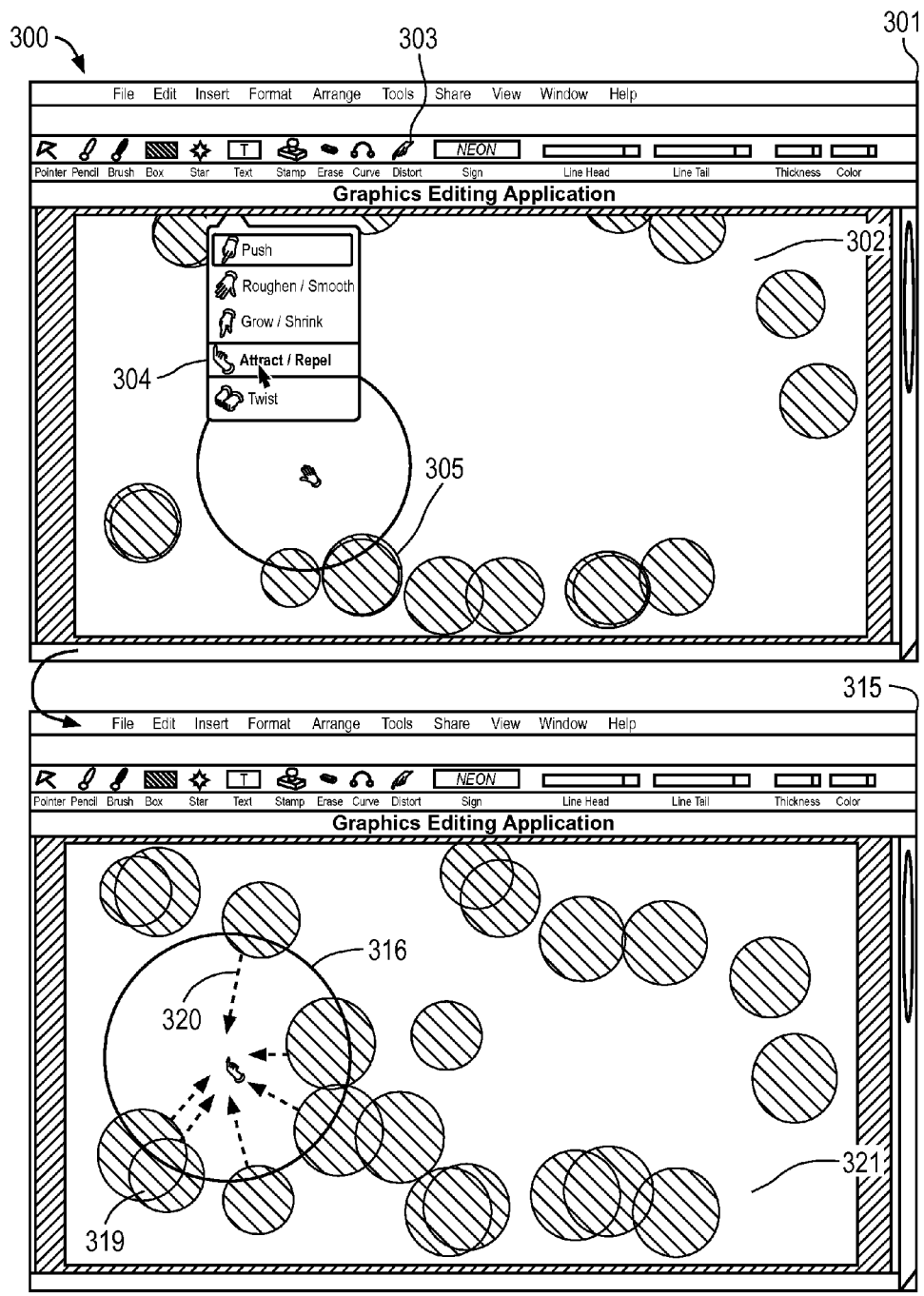
FIG. 3 illustrates an exemplary embodiment of a graphics editing application illustrating an attract shape feature in accordance with the present invention.

FIG. 3 illustrates an exemplary embodiment 300 of a graphics editing application illustrating an attract shape feature 304 in accordance with the present invention. The attract shape feature 304 may be implemented by one or more modules 802-805 of the graphics editing application 301. The attract shape feature 304 may become visible when the user of the graphics editing application 301 invokes a distort 303 icon on the user interface. Invoking the distort 303 icon on the user interface may call the selecting distortion feature module/engine 803 (shown in FIG. 8) with a passed value to indicate the attract shape feature 304. The selecting distortion feature module/engine 803 may receive data from the receiving drawing object module/engine 802 (shown in FIG. 8) indicating the location (e.g., x-coordinate, y-coordinate, z-coordinate, and/or other data) of the drawing objects 305 on the drawing area 302. The attract shape feature 304 may operate on all or some of the shapes/drawing objects 305 (e.g., circles) of the drawing area 302. The application of the attract shape feature 304 to the shapes/drawing objects 305 may include using a cursor, pointer, brush, or other icon 316 to apply an attracting force that may be calculated by the apply distortion feature module/engine 804 and/or the analysis module/engine 805 (shown in FIG. 8). The applied force 320 on one or more shapes/drawing objects 319 may be calculated based on the proximity of the icon 316 to the drawing objects 319. For example, the closer the icon 316 is to the drawing objects 319, the greater the force 320 that may be applied to the drawing objects 319. Similarly, the farther the icon 316 is from the drawing objects 319, the less the force 320 that may be applied to the drawing objects 319. In some embodiments, the size of the icon 316 may be changed such that the icon 316 is made smaller or larger in size (e.g., diameter); when made larger, more of the drawing objects 319 may be affected by less significant movements of the icon 316 on the drawing area 321, but when made smaller, less of the drawing objects 319 may be affected by more significant movements of the icon 316. An exemplary embodiment of the attract shape feature 304 is illustrated in the graphics editing application 315. The graphics editing application 315 illustrates the effect of applying the attract shape feature 304 in accordance with a force 320 that is applied to cause the drawing objects 319 to be attracted to the icon 316 on the drawing area; as illustrated in the graphics application 315, the drawing objects 319 may rest in a position where each drawing object may overlap another drawing object. The application of the force may be performed by the applying distortion feature module/engine 804 (shown in FIG. 8). The z-coordinate of each drawing object may determine which drawing object lies on the top of each other overlapping drawing object. In another embodiment, the drawing objects 319 may not be permitted to overlap and may repel each other on the drawing area 321. In such an embodiment, the force applied by the icon 316 may be transferred in full or in part to each drawing object with which an attracted drawing object may come into contact on the drawing area 321.

Figure 4:
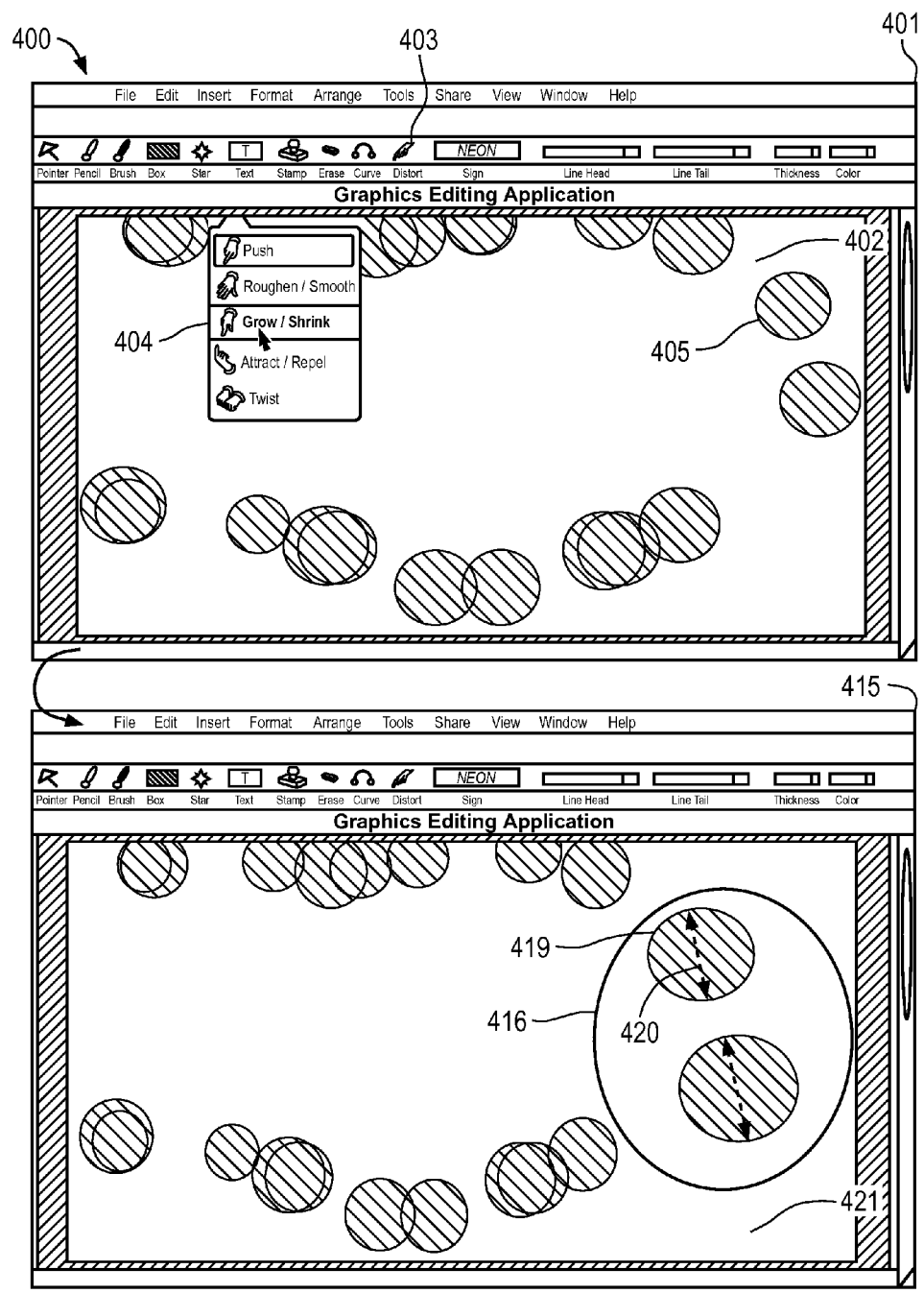
FIG. 4 illustrates an exemplary embodiment of a graphics editing application illustrating a grow shape feature in accordance with the present invention.

FIG. 4 illustrates an exemplary embodiment 400 of a graphics editing application 401 illustrating a grow shape feature 404 in accordance with the present invention. The grow shape feature 404 may be implemented by one or more modules 802-805 of the graphics editing application 401. The grow shape feature 404 may become visible when the user of the graphics editing application 401 invokes a distort 403 icon on the user interface. Invoking the distort 403 icon on the user interface may call the selecting distortion feature module/engine 803 (shown in FIG. 8) with a passed value to indicate the grow shape feature 404. The selecting distortion feature module/engine 803 may receive data from the receiving drawing object module/engine 802 (shown in FIG. 8) indicating the location (e.g., x-coordinate, y-coordinate, z-coordinate, and/or other data) of the drawing objects 405 on the drawing area 402. The grow shape feature 404 may operate on all or some of the shapes/drawing objects 405 (e.g., circles) of the drawing area 402. The application of the grow shape feature 404 to the shapes/drawing objects 405 may include using a cursor, pointer, brush, or other icon 416 to apply a growing force that may be calculated by the apply distortion feature module/engine 804 and/or the analysis module/engine 805 (shown in FIG. 8). The applied force 420 on one or more shapes/drawing objects 419 may be calculated based on the proximity of the icon 416 to the drawing objects 419. For example, the closer the icon 416 is to the drawing objects 419, the greater the force 420 that may be applied to the drawing objects 419. Similarly, the farther the icon 416 is from the drawing objects 419, the less the force 420 that may be applied to the drawing objects 419. In some embodiments, the size of the icon 416 may be changed such that the icon 416 is made smaller or larger in size (e.g., diameter); when made larger, more of the drawing objects 419 may be affected by coming into closer proximity to the icon 416 on the drawing area 421, but when made smaller, less of the drawing objects 419 may be affected. An exemplary embodiment of the grow shape feature 404 is illustrated in the graphics editing application 415. The graphics editing application 415 illustrates the effect of applying the grow shape feature 404 in accordance with a force 420 that is applied to cause the drawing objects 419 to grow on the drawing area. The application of the force may be performed by the applying distortion feature module/engine 804 (shown in FIG. 8). The force 420 applied may be calculated and applied according to the proximity of the icon 416 to the drawing objects 419; the closer the icon 416 is to the drawing objects 419, the greater the force that may be applied and the larger the drawing objects 419 may grow on the drawing area 421, and vice versa. In some embodiments, the greatest force 420, by default, that may be applied to the drawing objects 419 may cause the drawing objects 419 to double in their size on the drawing area 421. This default setting may be changed by the user of the graphics editing application 401, 415 according to one or more menu features 111 or icon shortcuts 110 (shown in FIG. 1).

Figure 5:
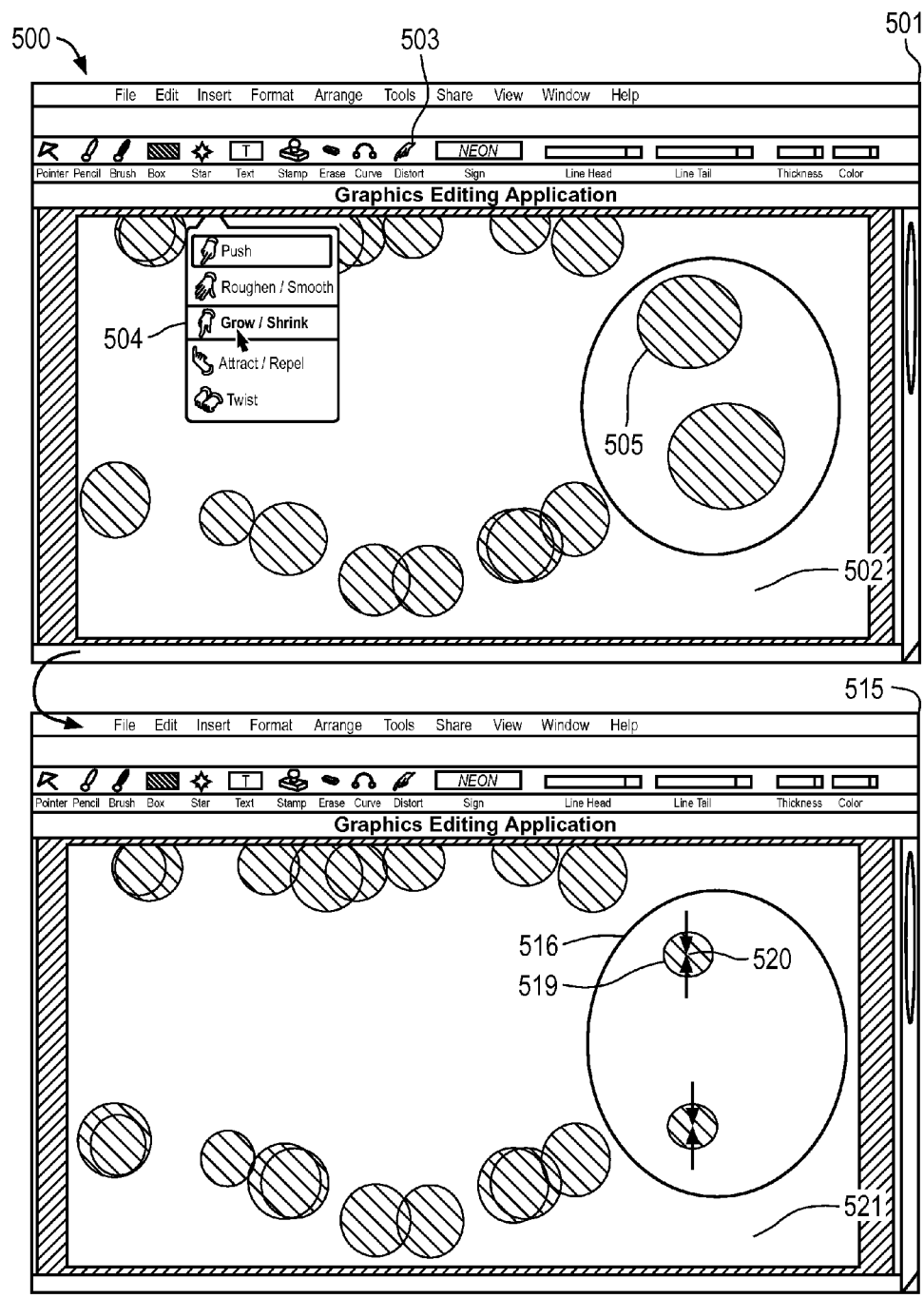
FIG. 5 illustrates an exemplary embodiment of a graphics editing application illustrating a shrink shape feature in accordance with the present invention.

FIG. 5 illustrates an exemplary embodiment 500 of a graphics editing application illustrating a shrink shape feature 504 in accordance with the present invention. The shrink shape feature 504 may be implemented by one or more modules 802-805 of the graphics editing application 501. The shrink shape feature 504 may become visible when the user of the graphics editing application 501 invokes a distort 503 icon on the user interface. Invoking the distort 503 icon on the user interface may call the selecting distortion feature module/engine 803 (shown in FIG. 8) with a passed value to indicate the shrink shape feature 504. The selecting distortion feature module/engine 803 may receive data from the receiving drawing object module/engine 802 (shown in FIG. 8) indicating the location (e.g., x-coordinate, y-coordinate, z-coordinate, and/or other data) of the drawing objects 505 on the drawing area 502. The shrink shape feature 504 may operate on all or some of the shapes/drawing objects 505 (e.g., circles) of the drawing area 502. The application of the shrink shape feature 504 to the shapes/drawing objects 505 may include using a cursor, pointer, brush, or other icon 516 to apply a shrinking force that may be calculated by the apply distortion feature module/engine 804 and/or the analysis module/engine 805 (shown in FIG. 8). The applied force 520 on one or more shapes/drawing objects 519 may be calculated based on the proximity of the icon 516 to the drawing objects 519. For example, the closer the icon 516 is to the drawing objects 519, the greater the force 520 that may be applied to the drawing objects 519. Similarly, the farther the icon 516 is from the drawing objects 519, the less the force 520 that may be applied to the drawing objects 519. In some embodiments, the size of the icon 516 may be changed such that the icon 516 is made smaller or larger in size (e.g., diameter); when made larger, more of the drawing objects 519 may be affected by coming into closer proximity to the icon 516 on the drawing area 521, but when made smaller, less of the drawing objects 519 may be affected. An exemplary embodiment of the shrink shape feature 504 is illustrated in the graphics editing application 515. The graphics editing application 515 illustrates the effect of applying the shrink shape feature 504 in accordance with a force 520 that is applied to cause the drawing objects 519 to shrink on the drawing area. The application of the force may be performed by the applying distortion feature module/engine 804 (shown in FIG. 8). The force 520 applied may be calculated and applied according to the proximity of the icon 516 to the drawing objects 519; the closer the icon 516 is to the drawing objects 519, the greater the force that may be applied and the smaller the drawing objects 519 may shrink on the drawing area 521, and vice versa. In some embodiments, the greatest force 520, by default, that may be applied to the drawing objects 519 may cause the drawing objects 519 to become half their size on the drawing area 521. This default setting may be changed by the user of the graphics editing application 501, 515 according to one or more menu features 111 or icon shortcuts 110 (shown in FIG. 1).

Figure 6:
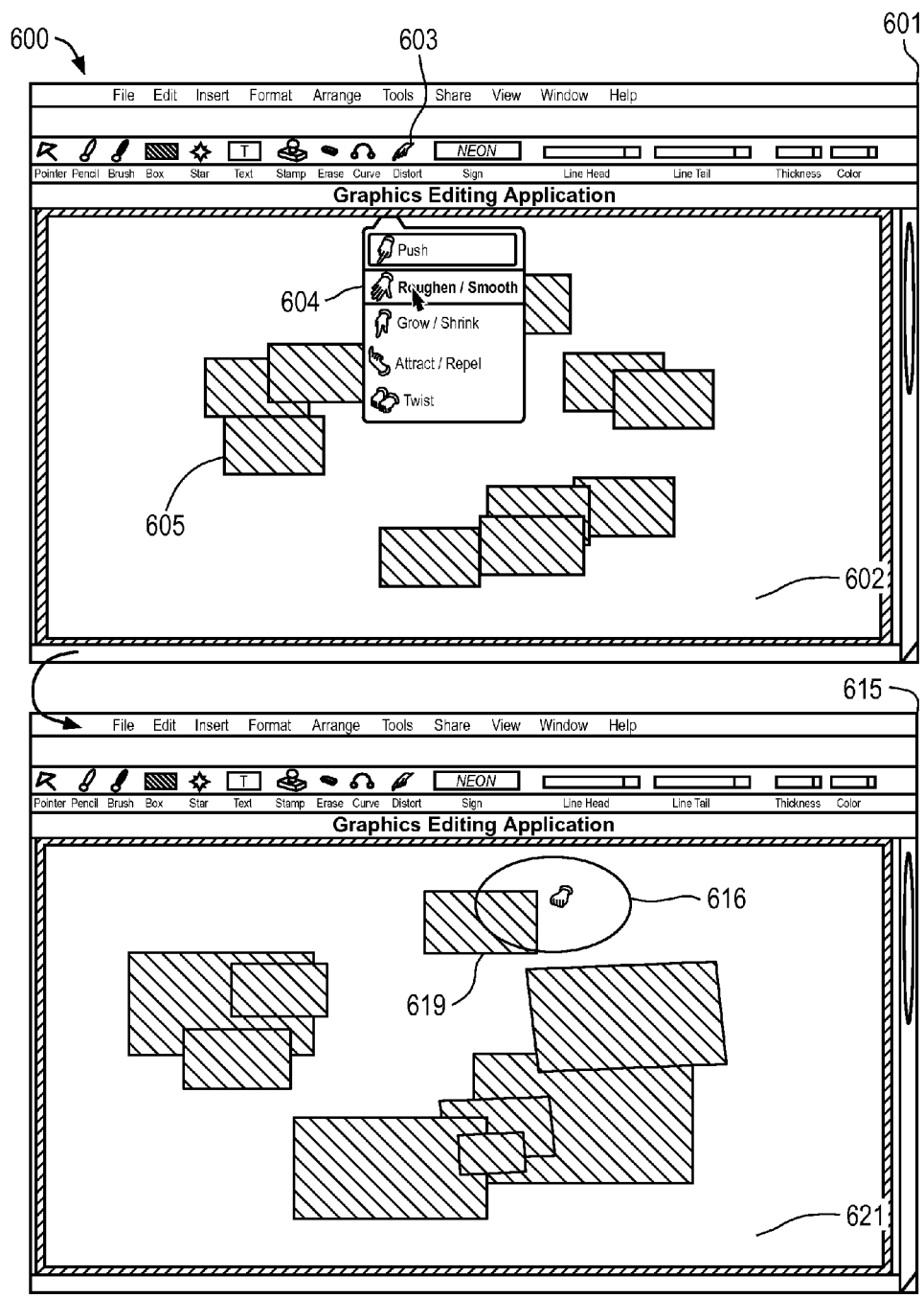
FIG. 6 illustrates an exemplary embodiment of a graphics editing application illustrating a roughen/smooth shape feature in accordance with the present invention.

FIG. 6 illustrates an exemplary embodiment 600 of a graphics editing application 601 illustrating a roughen/smooth shape feature 604 in accordance with the present invention. The roughen/smooth shape feature 604 may be implemented by one or more modules 802-805 of the graphics editing application 601. The roughen/smooth shape feature 604 may become visible when the user of the graphics editing application 601 invokes a distort 603 icon on the user interface. Invoking the distort 603 icon on the user interface may call the selecting distortion feature module/engine 803 (shown in FIG. 8) with a passed value to indicate the roughen/smooth shape feature 604. The selecting distortion feature module/engine 803 may receive data from the receiving drawing object module/engine 802 (shown in FIG. 8) indicating the location (e.g., x-coordinate, y-coordinate, z-coordinate, and/or other data) of the drawing objects 605 on the drawing area 602. The roughen/smooth shape feature 604 may operate on all or some of the shapes/drawing objects 605 (e.g., rectangles) of the drawing area 602. The application of the roughen/smooth shape feature 604 to the shapes/drawing objects 605 may include using a cursor, pointer, brush, or other icon 616 to apply a roughing/smoothing effect on the drawing objects 619, where during roughing the position of the drawing objects may be randomized (e.g., scattered) according to a random number generator of the apply distortion feature module/engine 804 and/or the analysis module/engine 805 (shown in FIG. 8); and, where during smoothing, the position of the drawing objects 619 may be returned to its initial state such that the effect of randomization is reversed (e.g., organized). During randomization, the application of the effect of randomized drawing objects 619 on the drawing area 621 may be calculated based on the proximity of the icon 616 to the drawing objects 619, or according to a threshold setting accessible through the menu features/options 111 or icon shortcuts 110 (shown in FIG. 1). For example, the closer the icon 616 is to the drawing objects 619, the greater the effect of randomized positioning of drawing objects 619. Similarly, the farther the icon 616 is from the drawing objects 619, the less the effect of randomized positioning of drawing objects 619. In some embodiments, the size of the icon 616 may be changed such that the icon 616 is made smaller or larger in size (e.g., diameter); when made larger, more of the drawing objects 619 may be affected by coming into closer proximity to the icon 616 on the drawing area 621, but when made smaller, less of the drawing objects 619 may be affected. An exemplary embodiment of the roughen/smooth shape feature 604 is illustrated in the graphics editing application 615. The graphics editing application 615 illustrates the effect of applying the roughen/smooth shape feature 604 in accordance with a randomized effect that is applied to cause the position of the drawing objects 619 to be changed randomly on the drawing area 621. The application of the force may be performed by the applying distortion feature module/engine 804 (shown in FIG. 8).

Figure 7:
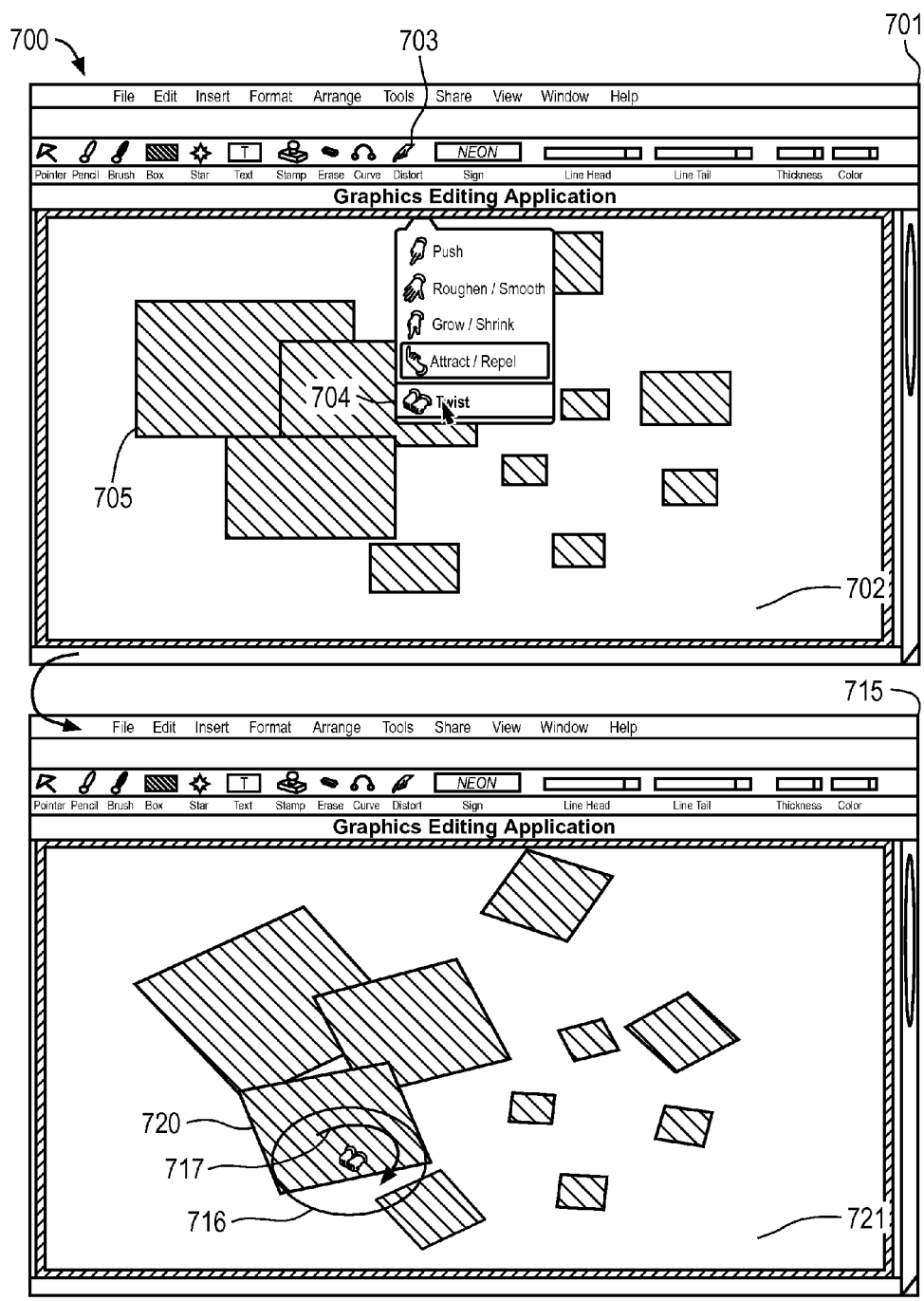
FIG. 7 illustrates an exemplary embodiment of a graphics editing application illustrating a twist shape feature in accordance with the present invention.

FIG. 7 illustrates an exemplary embodiment 700 of a graphics editing application 701 illustrating a twist shape feature 704 in accordance with the present invention. In some embodiments, a twist shape feature 704 may be implemented by one or more modules 802-805 of the graphics editing application 701. The twist shape feature 704 may become visible when the user of the graphics editing application 701 invokes a distort 703 icon on the user interface. Invoking the distort 703 icon on the user interface may call the selecting distortion feature module/engine 803 (shown in FIG. 8) with a passed value to indicate the twist shape feature 704. The selecting distortion feature module/engine 803 may receive data from the receiving drawing object module/engine 802 (shown in FIG. 8) indicating the location (e.g., x-coordinate, y-coordinate, z-coordinate, and/or other data) of the drawing object 705 on the drawing area 702. The twist shape feature 704 may operate on all or some part of the shape/drawing object 705 (e.g., rectangle) of the drawing area 702. The application of the twist shape feature 704 to the shape/drawing object 705 may include using a cursor, pointer, brush, or other icon 716 to apply a twisting force that may be calculated by the apply distortion feature module/engine 804 and/or the analysis module/engine 805 (shown in FIG. 8). The applied force 717 on all or some part of the shape/drawing object may be calculated based on a threshold and/or a direction (e.g., clockwise/counterclockwise) chosen from the menu features/options 111 or icon shortcuts 110, or the proximity of the icon 716 to the shape/drawing object 418. An exemplary embodiment of the twist shape feature 704 is illustrated in the graphics editing application 715. The graphics editing application 715 illustrates the effect of applying the twist shape feature 704 in accordance with a force 717 that is applied by the icon 716 to drawing object 720 to be rearranged clockwise/counterclockwise (i.e., twisted) on the drawing area 721; as illustrated in the graphics application 715, the drawing object 720 may rest in a position where it is rearranged clockwise. The application of the force 717 may be performed by the applying distortion feature module/engine 804 (shown in FIG. 8).

FIG. 8 illustrates exemplary modules 800 of a graphics editing application 801 in accordance with the present invention. The graphics editing application 801 may include modules for receiving a drawing object 802, selecting a distortion feature 803, applying a distortion feature 804, and analyzing 805 data/parameters.

In some embodiments, one or more of these modules 802-805 may communicate with a server 810 and database 811 hosted on the server 810 over a network 10. For example, one or more modules 802-805 may retrieve an XML/HTML file or other file type from the database 811. The file may include data about shapes/drawing objects.

In some embodiments, the graphics editing application 801 may be executed on the server 810 and a client application (not shown) may communicate with the graphics editing application 801 over the network 10, while the client application executes on a laptop, handheld device, or other device with a processor capable of executing the client application.

Figure 9:
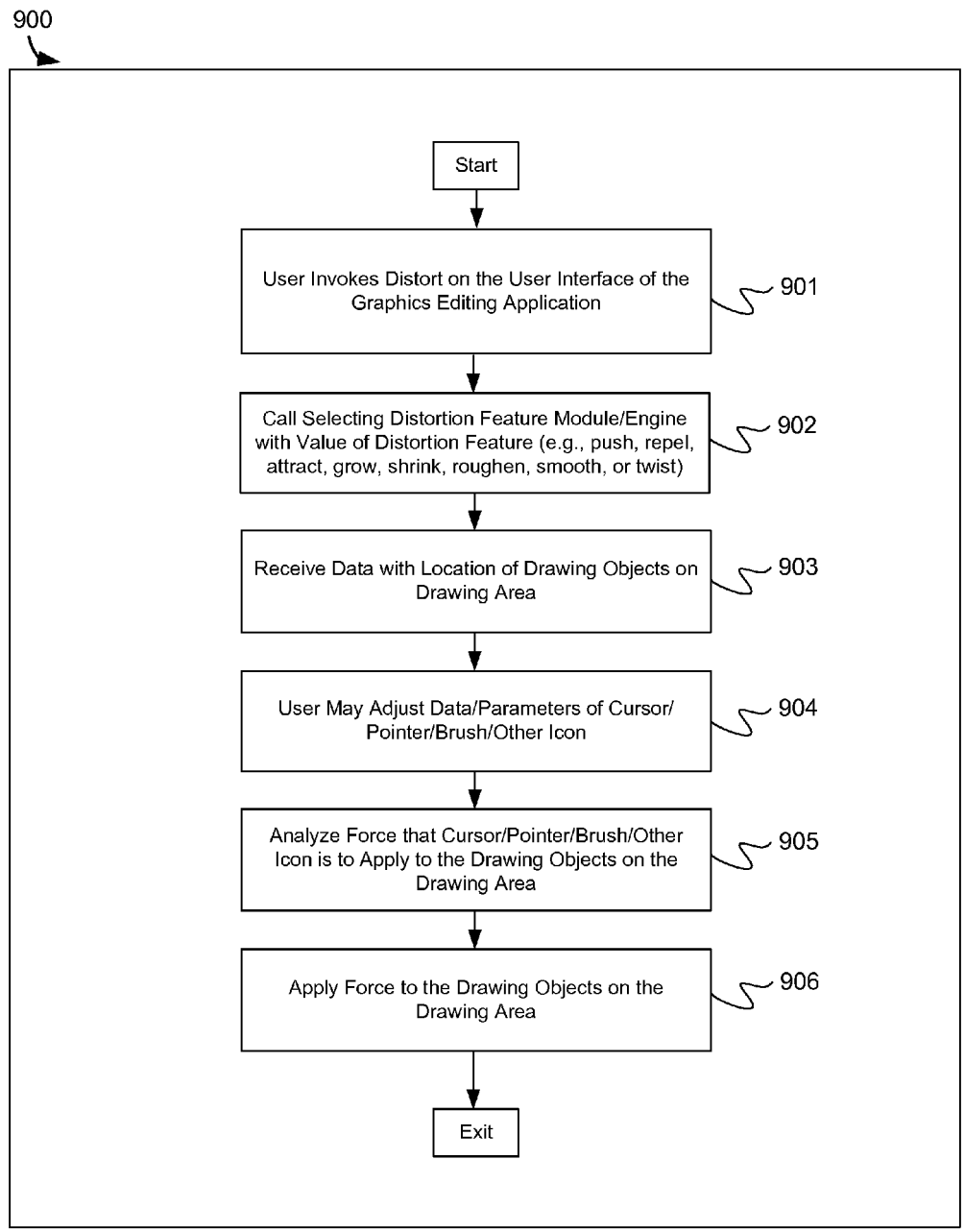
FIG. 9 illustrates an exemplary process flow diagram of the operation of exemplary modules of a graphics editing application in accordance with the present invention.

FIG. 9 illustrates an exemplary process flow diagram 900 of the operation of exemplary modules of a graphics editing application in accordance with the present invention. In some embodiments, the steps 901-906 may be performed in an order different than that shown in the exemplary process flow diagram 900, may be performed in part, may have one or more intervening steps, and may be implemented by the modules 901-905 or some other modules (not shown).

FIG. 10 illustrates an exemplary system block diagram of a system 1000 executing a graphics editing application 1008 in accordance with the present invention. The system may include a computer processing unit (CPU) 1001, memory 1002 (e.g., volatile or non-volatile), display device(s) 1003, network interface card (NIC) 1004, an interface for auxiliary device(s)/component(s) 1005, and local storage 1006 (e.g., non-volatile). An operating system 1007 may reside in local storage 1006, remotely on a network accessible by the NIC 1004, and/or memory 1002. Instructions being executed by the CPU 1001 may be fetched from memory 1002 and may include instructions from one or more modules of graphics editing application 1008 and/or one or more other applications. The system 1000 may be a handheld device, laptop computer, desktop computer, server, or some other system capable of housing the components 1001-1006.

Figure 11:
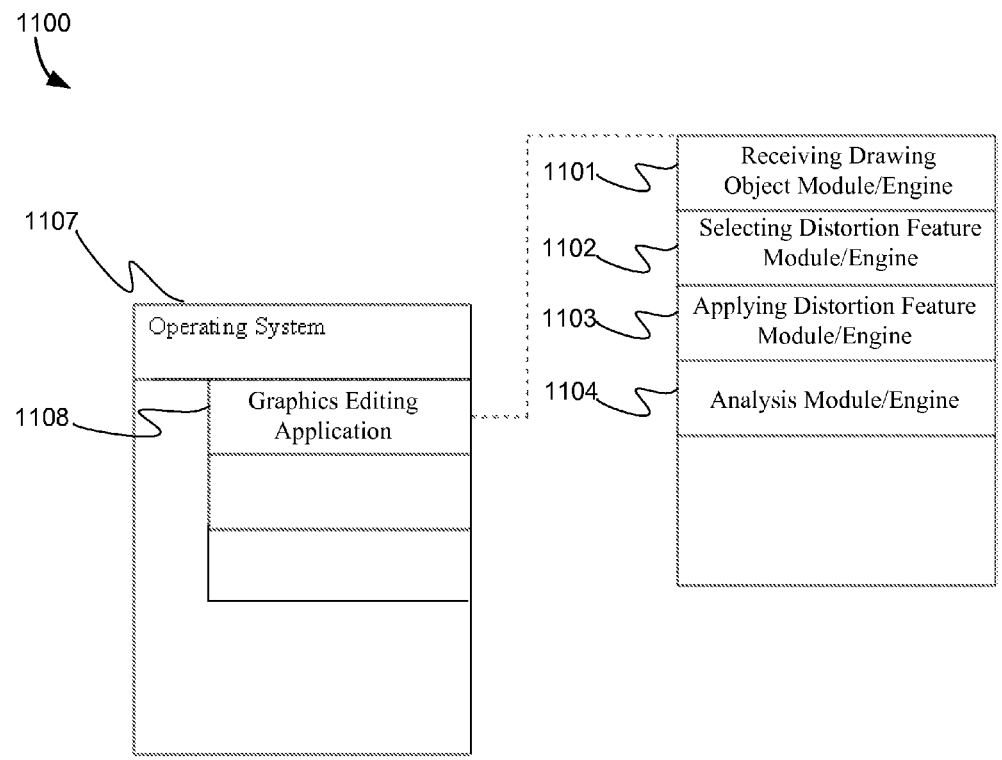
FIG. 11 illustrates an exemplary embodiment of a module block diagram of the execution of the modules/engines of a graphics editing application in accordance with the present invention.

FIG. 11 illustrates an exemplary module block diagram 1100 of the execution of the modules/engines of a graphics editing application 1108 in accordance with the present invention. The graphics editing application 1108 may be executed via an operating system 1107 responsible for managing the system on which it is stored or configured to manage. The graphics editing application 1108 may include one or more modules/engines for executing the instructions corresponding to the graphics editing application 101, 201, and 301, 401, 501, 601, and 701. The modules may include a receiving drawing object module/engine 1101, a selecting distortion feature module/engine 1102, an applying distortion feature module/engine 1103, and an analysis module/engine 1104.

Figure 12:
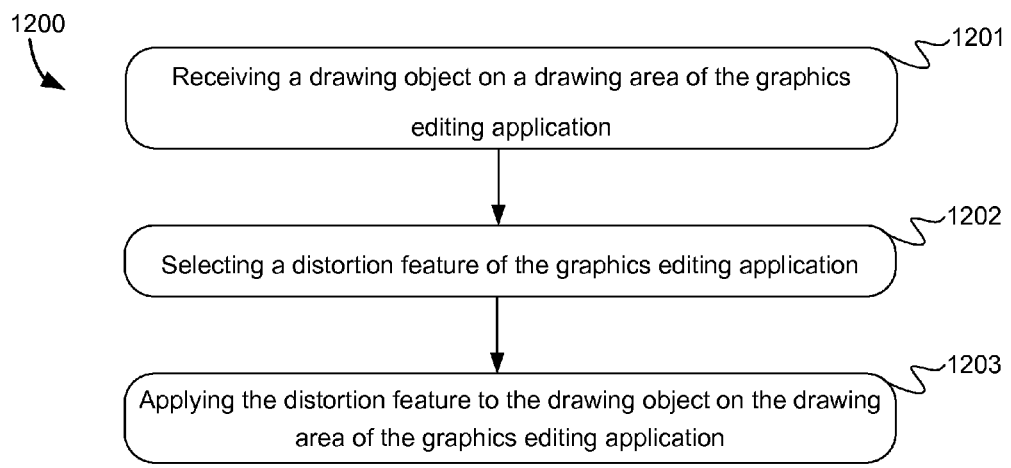
FIG. 12 illustrates exemplary method steps of a graphics editing application in accordance with the present invention.

FIG. 12 illustrates exemplary method steps 1200 of a graphics editing application in accordance with the present invention. The computer-implemented method steps are for receiving a drawing object on a drawing area of the graphics editing application 1201, selecting a distortion feature of the graphics editing application 1202, and applying the distortion feature to the drawing object on the drawing area of the graphics editing application 1203.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

I claim:

1. A computer-implemented method for distorting drawing objects in a graphics editing application, comprising:
   receiving a drawing object on a drawing area of the graphics editing application;
selecting a distortion feature of the graphics editing application;
   determining a proximity of an icon to the drawing object, wherein the icon has a size and the proximity depends at least in part on the size of the icon;
   varying a force of the distortion feature both inside and outside of the icon based at least in part on the proximity of the icon to the drawing object; and
   applying the distortion feature to the drawing object on the drawing area of the graphics editing application using the force.

2. The computer-implemented method of claim 1, wherein the drawing object comprises a point, a line, a circle, a polygon, or an image.

3. The computer-implemented method of claim 1, wherein the distortion feature comprises one or more of the following options: push, attract, or repel.

4. The computer-implemented method of claim 3, wherein the push option applies a force to the drawing object to push the drawing object in a direction of movement of the icon.

5. The computer-implemented method of claim 3, wherein the attract option attracts the drawing object to the icon on the drawing area.

6. The computer-implemented method of claim 3, wherein the repel option repels the drawing object away from the icon on the drawing area.

7. The computer-implemented method of claim 1, comprising receiving a selection of the size of the icon.

8. The computer-implemented method of claim 1, wherein the force is calculated according to a speed of the icon.

9. The computer-implemented method of claim 1, wherein the size of the icon comprises a diameter of the icon.

10. A system, comprising:
   one or more processors;
   memory;
   a display device;
   one or more programs stored in memory, the one or more programs comprising instructions to:
   receive a drawing object on a drawing area of the graphics editing application;
   select a distortion feature of the graphics editing application;
   determine a proximity of an icon to the drawing object, wherein the icon has a size and the proximity depends at least in part on the size of the icon;
   vary a force of the distortion feature both inside and outside of the icon based at least in part on the proximity of the icon to the drawing object when the drawing object is outside the icon and; and
   apply the distortion feature to the drawing object on the drawing area of the graphics editing application using the force.

11. The system of claim 10, wherein the drawing object comprises a point, a line, a circle, a polygon, or an image.

12. The system of claim 10, wherein the distortion feature comprises one or more of the following options: push, attract, or repel.

13. The system of claim 10, wherein the one or more programs comprise instructions to receive a selection of the size of the icon.

14. The system of claim 10, wherein the force is calculated according to a speed of the icon.

15. The system of claim 10, wherein the push option applies a force to the drawing object to push the drawing object in a direction of movement of the icon.

16. The system of claim 10, wherein the attract option attracts the drawing object to the icon on the drawing area.

17. The system of claim 10, wherein the repel option repels the drawing object away from the icon on the drawing area.

18. A non-transitory, computer-readable storage medium storing one or more programs configured for execution by a computer, the one or more programs comprising instructions to:
   receive a drawing object on a drawing area of the graphics editing application;
   select a distortion feature of the graphics editing application;
   determine a proximity of an icon to the drawing object, wherein the icon has a size and the proximity depends at least in part on the size of the icon;
   vary a force of the distortion feature both inside and outside of the icon based at least in part on the proximity of the icon to the drawing object; and
   apply the distortion feature to the drawing object on the drawing area of the graphics editing application.

19. The non-transitory, computer-readable storage medium of claim 18, wherein the one or more programs comprises instructions to one or more programs comprise instructions to receive a selection of the size of the icon.

20. The non-transitory, computer-readable medium of claim 18, wherein the distortion feature comprises one or more of the following options: push, attract, or repel.

* * * * *